(12) United States Patent
Yi et al.

(10) Patent No.: US 11,905,873 B1
(45) Date of Patent: Feb. 20, 2024

(54) ENGINE AFTERTREATMENT SYSTEM

(71) Applicant: Caterpillar Inc., Peoria, IL (US)

(72) Inventors: Yong Yi, Dunlap, IL (US); Ryan Kominkiewicz, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/814,344

(22) Filed: Jul. 22, 2022

(51) Int. Cl.
*F01N 3/20* (2006.01)
*F01N 3/035* (2006.01)
(Continued)

(52) U.S. Cl.
CPC ............. *F01N 3/208* (2013.01); *F01N 3/035* (2013.01); *F01N 13/009* (2014.06); *F01N 3/0231* (2013.01); *F01N 3/0814* (2013.01); *F01N 3/0821* (2013.01); *F01N 3/0871* (2013.01); *F01N 3/20* (2013.01); *F01N 3/2006* (2013.01); *F01N 2240/16* (2013.01); *F01N 2340/06* (2013.01); *F01N 2550/22* (2013.01); *F01N 2560/026* (2013.01); *F01N 2610/02* (2013.01); *F01N 2610/10* (2013.01); *F01N 2900/04* (2013.01); *F01N 2900/1402* (2013.01); *F01N 2900/1404* (2013.01); *F01N 2900/1614* (2013.01); *F01N 2900/1622* (2013.01);
(Continued)

(58) Field of Classification Search
CPC combination set(s) only.
See application file for complete search history.

(56) References Cited

U.S. PATENT DOCUMENTS 8,359,832 B2   1/2013  Yi et al.
9,132,386 B2   9/2015  Udd et al.
(Continued)

FOREIGN PATENT DOCUMENTS

DE   10 2019 118 528 A1   1/2021
EP      3073083 B1        3/2018
(Continued)

OTHER PUBLICATIONS

M. Iumetti, S. Bensaid, D. Fino and N. Russo: Catalysis in Diesel engine NOx aftertreatment: a review, atal. Struct. React., 2016, 1,155-173 (20 pages), available online at https://www.researchgate.net/publication/291823475.

*Primary Examiner* — Binh Q Tran
(74) *Attorney, Agent, or Firm* — Bookoff McAndrews, PLLC

(57) ABSTRACT

An engine exhaust aftertreatment system is disclosed. The system may comprise: an internal combustion engine having an intake passage and an exhaust passage; a turbocharger fluidly connected to the internal combustion engine, the turbocharger including a compressor and a turbine, the compressor being in fluid communication with the intake passage, and the turbine being in fluid communication with the exhaust passage; a reductant injector situated downstream of the turbocharger, wherein the reductant injector is closely coupled to the turbocharger such that a reductant is injected into an exhaust flow of the turbocharger; a first container downstream of the reductant injector, the first container including a multi-functional catalyst (MFC); and a second container downstream of the first container, the second container including a selective catalytic reduction (SCR) component and an Ammonia catalyst (AMOx) component.

20 Claims, 2 Drawing Sheets

(51) Int. Cl.
  *F01N 13/00* (2010.01)
  *F01N 3/023* (2006.01)
  *F01N 3/08* (2006.01)

(52) U.S. Cl.
  CPC ................ *F01N 2900/1806* (2013.01); *F01N 2900/1811* (2013.01)

(56) References Cited

U.S. PATENT DOCUMENTS

| | | | |
|---|---|---|---|
| 10,626,769 B2 | 4/2020 | Nilsson et al. | |
| 10,823,031 B2 | 11/2020 | Rohde et al. | |
| 10,934,918 B1* | 3/2021 | Goffe | B01D 53/9427 |
| 11,181,026 B1 | 11/2021 | Webb et al. | |
| 2008/0295482 A1* | 12/2008 | Gonze | F01N 3/2066 |
| | | | 60/273 |
| 2014/0331645 A1* | 11/2014 | Cole | F01N 3/2066 |
| | | | 60/274 |
| 2016/0281619 A1* | 9/2016 | Kale | B01D 53/9495 |
| 2017/0342884 A1* | 11/2017 | Lee | B01D 53/9418 |
| 2019/0155230 A1* | 5/2019 | Culbertson | F01N 3/208 |
| 2019/0338687 A1* | 11/2019 | Clayton, Jr. | F01N 13/0093 |
| 2019/0383189 A1* | 12/2019 | Dou | F01N 3/108 |
| 2020/0123950 A1 | 4/2020 | Kemmerling et al. | |
| 2020/0173331 A1* | 6/2020 | Bunkus | F01N 13/0093 |
| 2020/0408121 A1 | 12/2020 | Hruby et al. | |
| 2021/0123366 A1 | 4/2021 | Robel et al. | |

FOREIGN PATENT DOCUMENTS

| | | |
|---|---|---|
| EP | 3181847 B1 | 3/2019 |
| EP | 3 581 772 B1 | 12/2021 |
| FR | 3 102 797 A1 | 5/2021 |
| WO | 2018183658 A1 | 10/2018 |

\* cited by examiner

ENGINE AFTERTREATMENT SYSTEM

TECHNICAL FIELD

The present disclosure relates generally to internal combustion engine systems, and more particularly, to an improved dual-can reductant dosing aftertreatment system.

BACKGROUND

Internal combustion engines are used in various stationary and mobile applications to generate power by the combustion of a fuel such as diesel fuel. Internal combustion engines in both stationary and mobile applications may employ one or more turbochargers to improve power and/or efficiency. Internal combustion engines are commonly used in conjunction with one or more aftertreatment devices that receive exhaust from the engine and reduce an amount of undesired emissions such as nitrogen oxides (NOx). One exemplary aftertreatment device is a Selective Catalytic Reduction (SCR) device or SCR catalyst. SCR catalysts may react with NOx to produce nitrogen and water. However, this reaction also requires the presence of a reductant in the SCR catalyst. A storage system may be provided in communication with an aftertreatment system to supply a reductant-containing fluid, which may be referred to as diesel exhaust fluid (DEF), to the SCR catalyst. This fluid may contain urea that, when heated, produces a reductant (ammonia) that allows the SCR catalyst to react with NOx. In many cases, improving the mix of reductant-containing fluid with the exhaust from the engine can more efficiently reduce undesired emissions in engine exhaust. There exists a need to develop more efficient, less costly, more compact, and more effective aftertreatment devices that meet emissions regulations, for example, Tier 5 emissions regulations.

U.S. Pat. No. 9,132,386 (the '386 patent) to Udd et al. is another exemplary exhaust aftertreatment system. The system disclosed in the '386 patent includes a small SCR positioned close to an exhaust outlet of a turbocharger with a first injector positioned more closely to the exhaust outlet. The system includes a gaseous ammonia injector upstream of the small SCR and an ammonia tank, in addition to a separate reductant injector and reductant reservoir downstream of the gaseous ammonia injector, where the particulate filter is downstream of the ammonia injector and upstream of the reductant injector. The '386 patent recites that the first SCR catalyst is arranged less than 0.25 meters (approximately 9.84 inches) downstream from the turbocharger. The '386 patent further appears to have at least three containers or "cans" in its aftertreatment system.

While the system described in the '386 patent may be useful in some circumstances, it includes a more complex and less compact structure for an aftertreatment system, including at least 3 containers or cans and an ammonia tank and a separate reductant tank. The system of the '386 further omits other components which may be useful for improving a mix of reductant with an exhaust flow of an engine.

The disclosed method and system for a dual-can aftertreatment system may solve one or more of the problems set forth above and/or other problems in the art. The scope of the current disclosure, however, is defined by the attached claims, and not by the ability to solve any specific problem.

SUMMARY

In one aspect, an engine exhaust aftertreatment system is disclosed. The engine exhaust aftertreatment system may comprise: an internal combustion engine having an intake passage and an exhaust passage; a turbocharger fluidly connected to the internal combustion engine, the turbocharger including a compressor and a turbine, the compressor being in fluid communication with the intake passage, and the turbine being in fluid communication with the exhaust passage; a reductant injector situated downstream of the turbocharger, wherein the reductant injector is closely coupled to the turbocharger such that a reductant is injected into an exhaust flow of the turbocharger; a first container downstream of the reductant injector, the first container including a multi-functional catalyst (MFC); and a second container downstream of the first container, the second container including a selective catalytic reduction (SCR) component and an Ammonia catalyst (AMOx) component.

In another aspect, another engine exhaust aftertreatment system is disclosed. The engine exhaust aftertreatment system may comprise: an internal combustion engine having an intake passage and an exhaust passage; a turbocharger fluidly connected to the internal combustion engine, the turbocharger including a compressor and a turbine, the compressor being in fluid communication with the intake passage, and the turbine being in fluid communication with the exhaust passage; a first reductant injector situated downstream of the turbocharger; a heating element situated downstream of the first reductant injector; a first container downstream of the heating element, the first container including a multi-functional catalyst (MFC) and a catalytic diesel particulate filter (DPF); a second reductant injector situated downstream of the first container; a mixing component and a heating element situated downstream of the second reductant injector; a second container downstream of the mixing component and the heating element, the second container including a selective catalytic reduction (SCR) component and an Ammonia catalyst (AMOx) component; and a tailpipe situated downstream of the second container.

In yet another aspect, a method of operating an engine exhaust aftertreatment system is disclosed. The method comprises: providing a flow of exhaust from a turbocharger; injecting a reductant into the flow of exhaust within 5 inches downstream of the turbocharger; after injecting the reductant, heating the flow of exhaust; and providing the flow of exhaust to a first container including a multi-function catalyst (MFC).

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including,"

or other variations thereof, are intended to cover a nonexclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
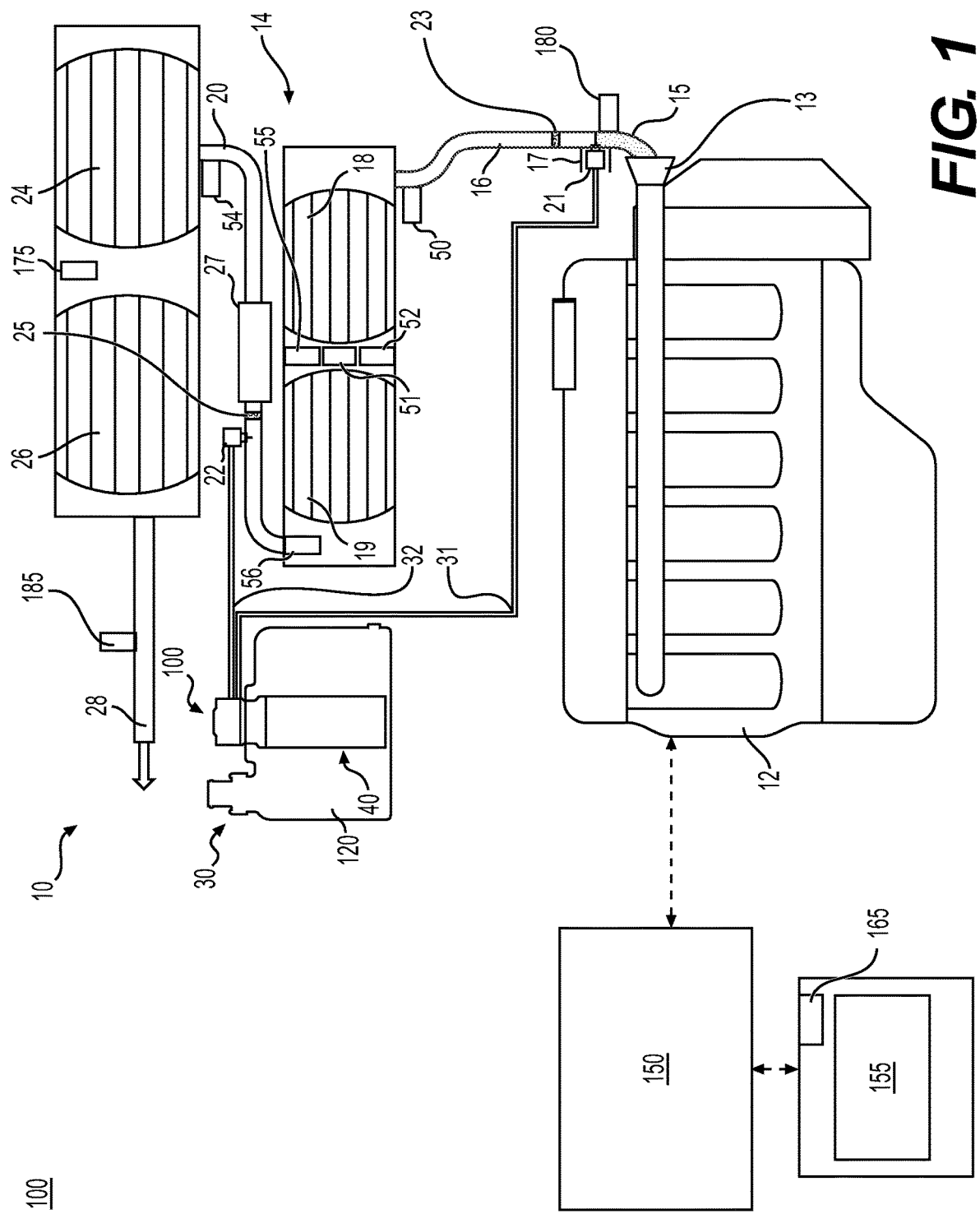
FIG. 1 is a schematic diagram illustrating an internal combustion engine system with a dual-can engine aftertreatment system, according to an aspect of the present disclosure.
Figure 2:
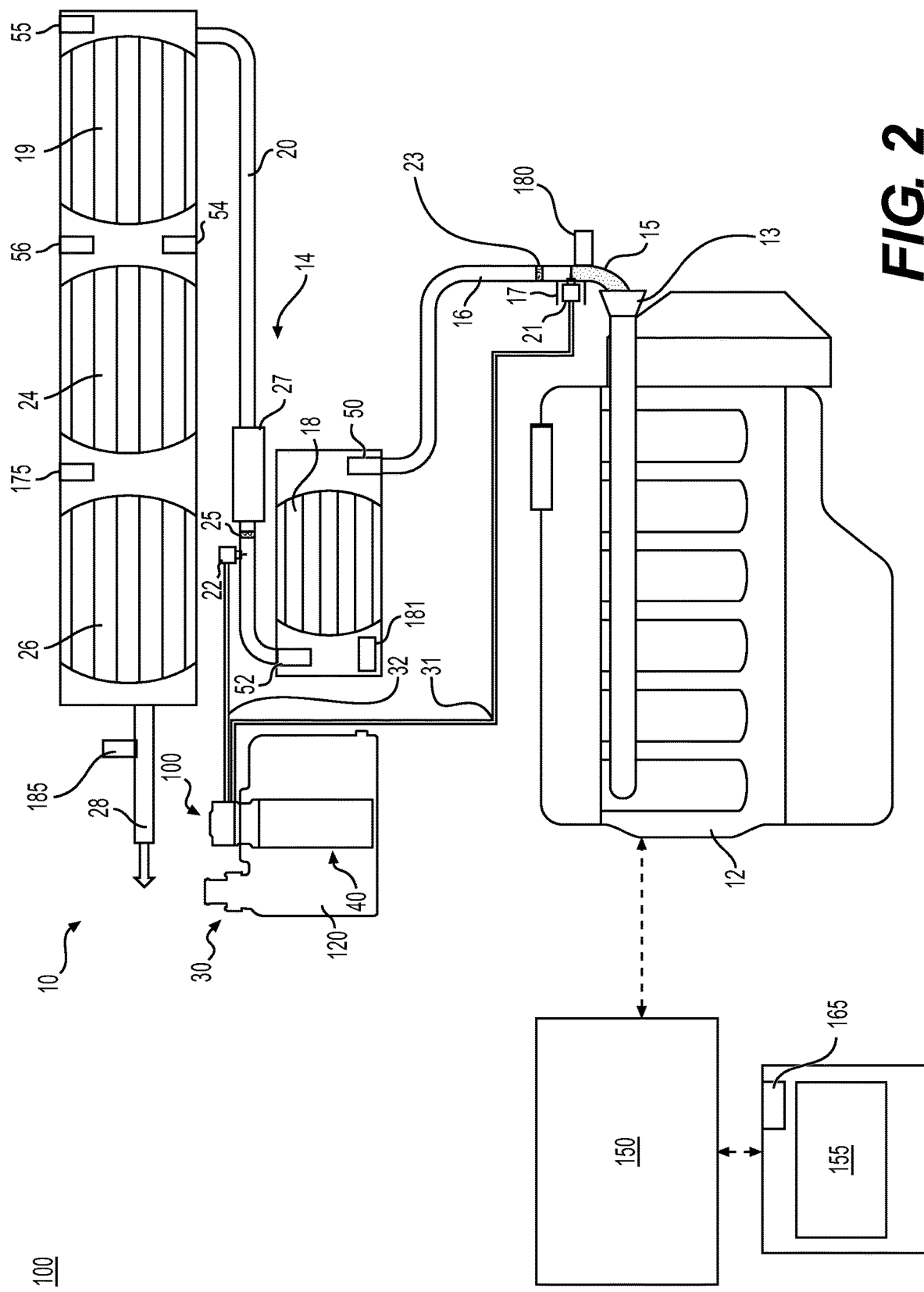
FIG. 2 is a schematic diagram illustrating another internal combustion engine system with a dual-can engine aftertreatment system, according to one or more aspects of the present disclosure.

FIGS. 1 and 2 illustrate an internal combustion engine system 10 that may include an engine 12 (e.g., an internal combustion engine), a turbocharger 13, an aftertreatment system 14 (e.g., an exhaust aftertreatment system) that receives and treats exhaust from engine 12, a controller 150, and a display 155. Internal combustion engine system 10 may be used in any capacity, for example, in mobile earthmoving machines or stationary gensets. Engine 12 may include a plurality of cylinders, within which one or more fuel injectors may be provided for injecting a fuel into respective a combustion chambers defined by respective cylinders. Engine 12 may include an intake manifold or intake passage for providing a flow of air to the combustion chamber of each cylinder. Engine 12 may also have one or more exhaust manifolds or exhaust passages that provide a path for combustion products or exhaust to exit the combustion chambers. While engine 12 may be a diesel internal combustion engine, any suitable combustion engine for combusting liquid fuel (e.g., gasoline, diesel, etc.) or gaseous (e.g., natural gas) fuel may employed as engine 12. While engine 12 may be configured as a single-fuel engine, engine 12 may instead be configured to operate on two different fuels (e.g., diesel and gaseous fuel). The exhaust passage of the engine 12 may be fluidly connected to the turbocharger 13. The turbocharger 13 may include a compressor (not shown) and a turbine. The turbocharger 13 may further be fluidly connected by first exhaust passage 15 that is upstream to one or more components of aftertreatment system 14.

Aftertreatment system 14 may include one or more aftertreatment devices 18, 19, 24, 26 and a reductant storage system 30 (e.g., a storage system for reductant such as diesel exhaust fluid (DEF)). Aftertreatment devices 18, 19, 24, 26 may include diesel oxidation catalysts, particulate filters, and selective catalytic reduction (SCR) components. As described further below with respect to FIG. 1, exemplary first aftertreatment device 18 may be a multi-functional catalyst (MFC) which oxidizes NO, CO, HC, and other matter in the exhaust stream. While a standard diesel oxidation catalyst (DOC) may be also be used for first aftertreatment device 18 in some aspects, the MFC is preferred for providing low temperature DeNOX, NO oxidation and active regeneration capabilities. First aftertreatment device 18 may be connected downstream of engine 12 via a first exhaust passage 15 and a second exhaust passage 16. A fourth exhaust passage 28 may extend downstream of third and fourth aftertreatment devices 24, 26, and may include one or more suitable passages for guiding treated exhaust gas to an exhaust outlet (e.g. a tailpipe). The first, second, third, and fourth aftertreatment devices 18, 19, 24, 26 may be connected in series with respect to a path of exhaust produced by engine 12. As shown in FIG. 1, second aftertreatment device 19 may be provided in a common housing (e.g. a "container" or "can") with first aftertreatment device 18, or may be provided in a separate housing.

The third exhaust passage 20 may be provided downstream of first aftertreatment device 18 (and as shown in FIG. 1, downstream of second aftertreatment device 19) and may extend to one or more additional aftertreatment devices, such as third aftertreatment device 24 and fourth aftertreatment device 26. Third aftertreatment device 24 may include an SCR catalyst. Fourth aftertreatment device 26 may include an oxidation catalyst such as an Ammonia oxidation catalyst (AMOx) component, or another suitable aftertreatment device. According to some aspects of the disclosure, the third aftertreatment device 24 may also include an inlet temperature sensor 54. As shown in FIG. 1, Fourth aftertreatment device 26 may be provided in a common housing with third aftertreatment device 24. According to some aspects of the disclosure, as shown in FIG. 2, the second aftertreatment device 19 may be provided in a common housing with the third aftertreatment device 24 and the fourth aftertreatment device 26. Accordingly, as shown in FIG. 2, second, third, and fourth aftertreatment devices 19, 24, 26 may be in fluid communication with, and downstream of, first aftertreatment device 18 via a third exhaust passage 20, for example, as shown in FIG. 2.

Reductant storage system 30 may form a containment, filtering, and heating device for reductant that includes a storage container 120, a header 100, and a filter assembly 40. Storage container 120 may be any suitable containment device that forms a reservoir for reductant. As used herein, the reductant (also known as a diesel exhaust fluid (DEF)) may include urea or any other appropriate fluid. Filter assembly 40 may extend within storage container 120 and may provide a seal at an upper opening of storage container 120, as described below. Storage system 30 may be connected to third exhaust passage 20 via a primary reductant injector 22 (e.g., DEF injector) and to first exhaust passage 15 via initial reductant injector 21 by reductant (DEF) supply passage 32. Primary reductant injector 22 may be provided at a distal end of reductant supply passage 32 and secured to third exhaust passage 20. Initial reductant injector 21 may be provided at a distal end of reductant supply passage 31 and secured to first exhaust passage 15. One or more reductant pumps (not shown) may be provided in header 100 or reductant supply passage 32 to pump reductant from storage system 30 to primary reductant injector 22. The header 100 may be removably fixed to the storage container 120 and may include one or more components extending within the storage system 30. For example, header 100 may include components to monitor, heat, pump, and outlet reductant (e.g., DEF). Reductant storage system 30. According to some aspects of the disclosure, a second reductant storage system (not shown) may be used to separately connect to initial reductant injector 21 via the initial reductant supply passage 31.

According to aspects of the disclosure, initial reductant injector 21 is closely coupled (e.g., situated less than 10 inches from) an exhaust exist of turbocharger 13. For example, the initial reductant injector 21 may be situated between first exhaust passage 15 and second exhaust passage 16. Close coupling of the initial reductant injector 21 downstream from the exhaust exit of turbocharger 13 allows for the reductant injected into the exhaust flow to be sufficiently mixed with the exhaust flow, such that another component, such as a baffle, is not needed. The initial reductant injector 21 is thus preferably situated very close to an exhaust exit of turbocharger 13 in order to promote mixing of the reductant with the exhaust flow as soon as the exhaust flow exits the turbocharger 13. Again, this avoids the need for the use of a baffle or other component to mix the exhaust flow when it exits the turbocharger, because the exhaust flow is in a generally turbulent state when it exits turbocharger 13, but becomes less turbulent as the exhaust flow progresses further downstream when time passes. To facilitate placing the initial reductant injector close to the turbocharger 13, a heat shield 17 may be applied or situated on the initial reductant injector 21 in order to reduce the effect of heat emitted from engine 12 or turbocharger 13 on the initial reductant injector 21. According to aspects of the disclosure, first exhaust passage 15 and second exhaust passage 16 may be made of the same material. According to other aspects, the first exhaust passage 15 may be made of a different material from second exhaust passage 16. For example, the first exhaust passage 15 between the turbocharger 13 and the initial reductant injector 21 may be made of a rigid or flexible elbow to improve the flexibility of installation and reduce the impact of engine vibration on the close-coupled DEF injector. In some embodiments, the initial reductant injector 21 is situated between 5 and 10 inches (for example, 6 inches) from the exhaust exit of turbocharger 13. In other aspects, the, the initial reductant injector 21 may be situated between 0.1 inches and 5 inches in length (for example, 0.1, 0.5, 1.0, 1.2, 1.5, 2.0, 2.3, 2.5, 3.0, 3.4, 3.5, 4.0, 4.5, 4.9, or 5 inches). In some aspects, the first exhaust passage 15 may be omitted entirely or be of negligible length, such that the initial reductant injector 21 is immediately adjacent and/or touching the exhaust exit of turbocharger 13, and an exhaust flow from turbocharger 13 immediately reaches the initial reductant injector 21 before reaching the second exhaust passage 16.

According to some aspects, the second exhaust passage 16 may be insulated and/or flexible. Further, a heating element for increasing the temperature of a flow of exhaust through second exhaust passage 16 may be situated downstream of the initial reductant injector 21. Preferably, the heating element is situated immediately adjacent or very close to the initial reductant injector 21. The heating element 23 should provide heat to the exhaust flow sufficient to promote mixing of an exhaust flow with a reductant injected by initial reductant injector 21. The heating element may be, for example, an electrical heater, an exhaust burner using diesel fuel, or an electrically heated mixer. According to aspects of the disclosure, the heat may further be sufficient to raise the exhaust flow to a temperature sufficient to assist with other aspects of the aftertreatment system 14, including removal of sulfur or other undesirable materials in the exhaust flow and from other downstream components.

The aftertreatment system 14 may further include a mixing component 27 situated downstream of the primary reductant injector 22 and upstream of the third aftertreatment device 24 as shown in FIG. 1. As shown in FIG. 2, the mixing component 27 may be situated downstream of the primary reductant injector 22 and upstream of the second aftertreatment device 19, for example, on third exhaust passage 20. In both FIGS. 1 and 2, the mixing component 27 is situated after the primary reductant injector 22, and more preferably, immediately after the primary reductant injector 22 in order to better facilitate mixing of the urea and the exhaust flow immediately after injection of reductant by primary reductant injector 22. The mixing component 27 may be, for example, a baffle or other structure for impinging exhaust flow. According to some aspects, as shown in FIGS. 1-2, a heating element is situated downstream of the primary reductant injector 22 and upstream of the mixing component 27, in order to further facilitate mixing of the reductant with the exhaust flow as well as provide other benefits including cleansing of sulfur and other particulates that may accumulate on one or more components of aftertreatment system 14 due to the exhaust flow.

The internal combustion engine system 10 may further have sensors for detecting one or more parameters of the internal combustion engine system 10. For example, the internal combustion engine system 10 may have mass flow sensors (not shown), a first NOx sensor 180, a first temperature sensor 50, a second temperature sensor 52, a second NOx sensor 51, a first deltaP sensor 55, a second deltaP sensor 56, a third temperature sensor 54, an NH3 sensor 175, a fill sensor (not shown), and/or a tailpipe NOx sensor 185 (e.g., third NOx sensor). The mass flow sensors (not shown) may be located within engine 12, and may measure parameters associated with calculating a mass flow including, for example, engine speed, density, fuel, and so forth.

The first NOx sensor may be a sensor that measures nitrogen oxide (NOx) levels in the exhaust of engine 12, and may be located at an exhaust of the engine 12 prior to the exhaust being treated by the first aftertreatment device 18. According to aspects of this disclosure, as shown in FIG. 1, the first NOx sensor may be situated on first exhaust passage 15 downstream from the turbocharger 13, and upstream from the initial reductant injector 21. NOx may include nitric oxides, nitrogen dioxide, and other gasses that may be emitted in the exhaust of engine 12. Similarly, the second NOx sensor 51 may be situated in a first container (e.g. can) in between the first aftertreatment device 18 and second aftertreatment device 19 as shown in FIG. 1. In some aspects, the second NOx sensor 51 may be situated downstream the first aftertreatment device 18, and may be situated in the container or on an exhaust passage upstream of the primary reductant injector 22. A tailpipe NOx sensor 185 may similarly measure NOx levels in the tailpipe or exhaust outlet of the internal combustion engine system 10, e.g., after the exhaust of engine 12 has been treated by the aftertreatment system 14.

The first temperature sensor 50 as shown in FIGS. 1-2 is situated upstream of first aftertreatment device 18, in order to measure the temperature of the exhaust flow prior to treatment by first aftertreatment device 18. The first temperature sensor 50 may be situated on second exhaust passage 16 upstream of first aftertreatment device 18 as shown in FIGS. 1 and 2. According to other aspects of the disclosure, the first temperature sensor 50 may be situated within the container housing the first aftertreatment device 18, so long as the first temperature sensor 50 is upstream of the first aftertreatment device. Preferably, the first temperature sensor 50 is upstream and close to the first aftertreatment device 18, in order to obtain an accurate temperature of the exhaust flow immediately prior to the exhaust flow reaching the first aftertreatment device 18. According to aspects of the disclosure, more than one first temperature sensor 50 may be implemented while still being within the scope of this disclosure. According to aspects of the disclosure, as shown in FIG. 1, the second temperature sensor 52 may be within the first container downstream of first aftertreatment device 18 and upstream of second aftertreatment device 19. As shown in FIG. 2, the second temperature sensor 52 may be situated within the first storage container or can downstream of the first after treatment device 18. While the second temperature sensor 52 is shown as within the same storage container or can as the first after treatment device 18, the second temperature sensor 52 may be placed outside the storage container or can, for example, on third exhaust passage 20 or another exhaust passage (not shown) downstream of the first aftertreatment device 18. Similarly, a third temperature sensor 54 may be implemented to measure a temperature of an exhaust flow upstream of the third aftertreatment device 24, in order to measure a temperature of the exhaust flow after treatment by the first aftertreatment device 18 and/or second treatment device 19. The third temperature sensor 54 may be situated on third exhaust passage 20 upstream of the third aftertreatment device 24, or may be situated within the second container or can that encloses third aftertreatment device 24 and fourth aftertreatment device 26, so long as the third temperature sensor 54 is upstream of the third aftertreatment device 24. As shown in FIG. 2, the temperature sensor 54 may be situated within a second container or can housing the second aftertreatment device 19, the third aftertreatment device 24, and the fourth aftertreatment device 26.

In aspects of the disclosure where the second aftertreatment device 19 is a catalytic or non-catalytic diesel particulate filter (DPF), a deltaP sensor may be implemented across the second aftertreatment device 19. The first pressure probe 55 may measure a pressure value of the exhaust flow prior to treatment by the second aftertreatment device 19, and the second pressure probe 56 may measure a pressure value of the exhaust flow after treatment by the second aftertreatment device 19. In this manner, a pressure drop across the aftertreatment device 19, in combination with other data and/or one or more known models, is used to detect high particulate count. A high particulate count may further indicate a need to clean or perform maintenance on one or more components of the aftertreatment system 14. As shown in FIG. 1, first deltaP sensor 55 may be situated in the first container or can downstream of the first aftertreatment device 18 and upstream of the second aftertreatment device 19, and the second deltaP sensor 56 may be situated in the first container (or alternatively on third exhaust passage 20) downstream of the first aftertreatment device 18 and upstream of the primary reductant injector 22. Alternatively, as shown in FIG. 2, where the second aftertreatment device 19 is contained within the second storage container or can with the third aftertreatment device 24 and the fourth aftertreatment device 26, the first deltaP sensor 55 may be situated either on third exhaust passage 20 or within the second storage container or can upstream of the second aftertreatment device 19. The second deltaP sensor 56, as shown in FIG. 2, may be situated within the second storage container or can downstream of the second aftertreatment device 19 and upstream the third aftertreatment device 24.

The aftertreatment system 14 may further include an NH3 sensor 175 for measuring an ammonia level (e.g., NH3 level) in the exhaust flow. The NH3 sensor 175, as shown in FIGS. 1-2, may be situated downstream of the third aftertreatment device 24 and upstream of the fourth aftertreatment device 26. A fill sensor (not shown) may further be used to calculate the amount of reductant (e.g. DEF) in the storage container 120.

The internal combustion engine system 10 may further have a controller 150 configured to receive data from one or more sensors associated with the internal combustion engine system 10 as well as transmit data to one or more devices associated with the internal combustion engine system 10. The controller 150 may include at least one memory device storing instructions to perform various control functions and processes; at least one processor executing the instructions from memory device to perform a set of desired operations; and a communication interface facilitating the communication between various system components. The instructions may be non-transitory computer-readable instructions for executing a control application. A communication interface of the controller 150 may enable the controller 150 to communicate with the display 155 and a network interface (not shown). Accordingly, controller 150 may be configured to generate and return a GUI on display 155. Controller 150 may also include a wide variety of components or subsystems such as, processors, cache memory, memory controller, graphics controllers, network adapters, data processing devices, etc. In addition to performing logic, mathematical and other operations on data, the controller 150 may be configured to communicate or transfer data to and from the display 155, the network interface, sensors associated with the internal combustion engine system 10, and so forth. Although embodiments herein may be discussed as being performed by controller 150, various steps may be performed partially or entirely by other components, controllers, processors, devices, servers etc.

The controller 150 may receive data from one or more sensors described above with respect to FIGS. 1-2. The controller 150 may further be configured to transmit commands or messages to one or more devices associated with the internal combustion engine system 10. The controller 150 may further be connected with a display 155 of the internal combustion engine system 10, including an ON/OFF switch 165 (e.g. a key on-off switch) used to turn the engine 12 on and off. The display 155 may include any device capable of visual or tactile presentation of data and images in a form intelligible to a user. In some embodiments, the display 155 may present information dynamically in a visual medium. In some other embodiments, the display 155 may support a tactile display (display that may be felt by the fingers—and intended for the visually impaired) of data and images. In some embodiments, the display 155 supporting a tactile display may further be audio-enabled, such that parameter elements are associated with one or more sounds (e.g. musical tones, filtered noises, recorded sound effects, synthesized speech, and the like). Non-limiting examples of the display 155 may include a cathode ray tube, a liquid crystal display, a light emitting display, a plasma display, etc. In some embodiments, the display 155 may also accept input. In these embodiments, the display 155 may include a touch screen where information may be entered by selecting one of multiple options presented on the display. Selecting an option may be accomplished using a mouse (as is well known in the art), or touching an area of the display. In some embodiments, display 155 may comprise two or more displays in communication with controller 150.

INDUSTRIAL APPLICABILITY

The disclosed aspects of the aftertreatment system 14 and internal combustion engine system 10 may be employed in a variety of machines and/or vehicles. For example, aftertreatment system 14 may be employed in stationary machines for electrical power creation, such as generators. However, the aftertreatment system 14 may be configured to efficiently reduce NOx emissions of any internal combustion engine or power system.

As shown in FIG. 1, during the operation of internal combustion engine system 10, engine 12 combusts fuel (e.g., diesel) and generates NOx-containing exhaust. Exhaust may exit engine 12 and turbocharger 13 for treatment by aftertreatment system 14, in which aftertreatment devices 18, 19, 24, 26 may reduce one or more undesired components from the exhaust. First exhaust passage 15 and second exhaust passage 16 may provide a path for exhaust to flow from engine 12 to the first aftertreatment device 18 and the second aftertreatment device 19. A first reductant may be injected into the exhaust via initial reductant injector 21, which is protected by a heat shield 17 due to the heat generated by being in close proximity to the turbocharger 13. After injection by initial reductant injector 21, the exhaust may be heated by a heating element 23 before it travels, via second exhaust passage 16, to a first container enclosing first aftertreatment device 18 and second aftertreatment device 19. After passing through second aftertreatment device 19, a primary reductant injector 22 may inject additional reductant into the exhaust. The exhaust may then be heated by a heating element 25 as well as mixed by a mixing component 27. The exhaust and reductant may then travel from third exhaust passage 20 to aftertreatment devices 24 and 26, at least one of which may include an SCR catalyst that reduces NOx via a reaction involving the catalyst and reductant. Exhaust may exit aftertreatment system 14 via fourth exhaust passage 28.

The disclosed systems and method may improve the efficiency and performance of aftertreatment systems for engines. For example, closely-coupling the initial reductant injector 21 to the turbocharger (for example, placing the initial reductant injector 21 at the end of the first exhaust passage 15 opposite the turbocharger 13, where the first exhaust passage 15 is less than 5 inches in length) may provide for improved mixing of reductant with the exhaust flow. Further, situating the initial reductant injector 21 close to the turbocharger 13 results in a more compact and less complex system, as additional mixing components (such as baffles) are not needed to assist with mixing the reductant with exhaust. Further, the disclosed system in FIGS. 1-2 only requires two "containers" or "cans" for the aftertreatment devices 18, 19, 24, and 26, further increasing the efficiency and compactness of the system. Additionally, the inclusion of heater elements 23 and 25, and a diesel particulate filter (DPF) in second aftertreatment device 19 results in additional benefits, including improved removal of sulfur and other particulates from the exhaust and one or more components of the aftertreatment system 14, resulting in increased cleanliness and reduced maintenance and service costs for the aftertreatment system 14.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. An engine exhaust aftertreatment system, comprising:
an internal combustion engine having an intake passage and an exhaust passage;
a turbocharger fluidly connected to the internal combustion engine, the turbocharger including a compressor and a turbine, the compressor being in fluid communication with the intake passage, and the turbine being in fluid communication with the exhaust passage;
a first reductant injector situated downstream of the turbocharger, wherein the first reductant injector is closely coupled to the turbocharger such that a reductant is injected into an exhaust flow of the turbocharger;
a first heating element situated downstream of the first reductant injector;
a first container downstream of the first reductant injector, the first container including a multi-functional catalyst (MFC) component;
a second reductant injector situated downstream of the first container;
a mixing component and a second heating element situated downstream of the second reductant injector; and
a second container downstream of the first container, the second container including a selective catalytic reduction (SCR) component and an Ammonia catalyst (AMOx) component.

2. The system of claim 1, wherein the first reductant injector is situated less than 5 inches downstream of the turbocharger.

3. The system of claim 1, wherein the first reductant injector is further immediately adjacent to an exit of the turbocharger.

4. The system of claim 1,
wherein the first heating element is situated downstream of the first reductant injector and upstream of the first container, and wherein the system further includes:
a heat shield.

5. The system of claim 1, further comprising:
a diesel particulate filter (DPF) component situated within the first container or the second container;
a first deltaP sensor situated upstream of the DPF component; and
a second deltaP sensor situated downstream of the DPF component.

6. The system of claim 5, wherein the DPF component is non-catalytic.

7. The system of claim 1,
wherein the second reductant injector is situated upstream of the second container.

8. The system of claim 7, further including:
a mixing component downstream of the second reductant injector and upstream of the second container.

9. The system of claim 1, further including:
a temperature sensor situated downstream of the first container and upstream of the second container;
an NH3 sensor situated within the second container; and/or
one or more NOx sensors situated:
downstream of the turbocharger and upstream of the first container;
downstream of the first container and upstream of the second container; and/or
within the first container and/or the second container.

10. The system of claim 1, wherein the reductant is Diesel Exhaust Fluid (DEF).

11. An engine exhaust aftertreatment system, comprising:
an internal combustion engine having an intake passage and an exhaust passage;
a turbocharger fluidly connected to the internal combustion engine, the turbocharger including a compressor and a turbine, the compressor being in fluid communication with the intake passage, and the turbine being in fluid communication with the exhaust passage;
a first reductant injector situated downstream of the turbocharger;
a heating element situated downstream of the first reductant injector;
a first container downstream of the heating element, the first container including a multi-functional catalyst (MFC) component and a catalytic diesel particulate filter (DPF) component;
a second reductant injector situated downstream of the first container;
a mixing component and a heating element situated downstream of the second reductant injector;
a second container downstream of the mixing component and the heating element, the second container including a selective catalytic reduction (SCR) component and an Ammonia catalyst (AMOx) component; and a tailpipe situated downstream of the second container.

12. The system of claim 11, wherein the first reductant injector is situated less than 5 inches downstream of the turbocharger.

13. The system of claim 11, wherein the first reductant injector is immediately adjacent to the turbocharger.

14. The system of claim 11, wherein the first container includes:
- a first deltaP sensor situated upstream of the DPF component;
- a second deltaP sensor situated downstream of the DPF component; and
- a NOx sensor and a temperature sensor in between the MFC component and the DPF component.

15. The system of claim 11, further including:
- a temperature sensor situated downstream of the first container and upstream of the second container;
- an NH3 sensor situated within the second container; and/or
- one or more NOx sensors situated:
  - downstream of the turbocharger and upstream of the first container;
  - downstream of the first container and upstream of the second container; and/or
  - within the first container and/or the second container.

16. A method of operating an engine exhaust aftertreatment system, comprising:
- providing a flow of exhaust from a turbocharger;
- injecting a reductant into the flow of exhaust within 5 inches downstream of the turbocharger with a first reductant injector;
- after injecting the reductant, heating the flow of exhaust with a first heater;
- providing the flow of exhaust to a first container including a multi-function catalyst (MFC) component;
- injecting additional reductant into the flow of exhaust downstream of the first heater with a second reductant injector; and
- after injecting the additional reductant, heating the flow of exhaust with a second heater.

17. The method of claim 16, further comprising:
- after injecting additional reductant, mixing the flow of exhaust; and
- after mixing the flow of exhaust, providing the flow of exhaust to a second container including a selective catalytic reduction (SCR) component and an Ammonia catalyst (AMOx) component.

18. The method of claim 17, further comprising:
providing the flow of exhaust to one of:
- a catalytic diesel particulate filter (DPF) component situated within the first container; or
- a non-catalytic DPF component situated within the second container.

19. The method of claim 17,
wherein, after injecting additional reductant, the flow of exhaust is heated upstream of the second container.

20. The method of claim 18, further comprising:
measuring a temperature of the flow of exhaust downstream of the first container and upstream of the second container;
measuring an NH3 level within the second container; and/or
measuring an NOx level of the exhaust:
- downstream of the turbocharger and upstream of the first container;
- downstream of the first container and upstream of the second container; and/or
- within the first container and/or second container.

* * * * *